United States Patent [19]

McCloskey

[11] 4,038,733

[45] Aug. 2, 1977

[54] METHOD OF MANUFACTURING A SELF-ALIGNING BEARING WITH A DEFORMABLE INNER MEMBER

[75] Inventor: Albert R. McCloskey, Fairfield, Conn.

[73] Assignee: Heim Universal Corporation, Fairfield, Conn.

[21] Appl. No.: 574,859

[22] Filed: May 6, 1975

[51] Int. Cl.² ............................................. B21D 53/10
[52] U.S. Cl. ..................... 29/149.5 B; 29/149.5 NM
[58] Field of Search ............... 29/149.5 C, 149.5 NM, 29/149.5 B; 308/72

[56] References Cited

U.S. PATENT DOCUMENTS

| 1,803,491 | 5/1931 | Thiry | 29/149.5 NM |
| 1,871,861 | 8/1932 | Rossman | 29/149.5 NM |
| 2,606,795 | 8/1952 | Hutton | 308/72 |
| 2,995,813 | 8/1961 | Board, Jr. | 29/149.5 B |
| 3,020,101 | 2/1962 | McCaslin | 308/72 |
| 3,089,221 | 5/1963 | Barr | 29/148.4 A |
| 3,298,754 | 1/1967 | Riester | 308/72 |
| 3,555,645 | 1/1971 | Kuhn | 29/149.5 B |

FOREIGN PATENT DOCUMENTS

| 1,367,898 | 6/1964 | France | 29/149.5 B |

*Primary Examiner*—C.W. Lanham
*Assistant Examiner*—V. Rising
*Attorney, Agent, or Firm*—James C. Wray

[57] ABSTRACT

A self-aligning bearing assembly comprising an outer member having a concave inner surface and an inner member carried within the outer member and having a convex outer surface generally complementary to the concave inner surface, the inner member being a deformable plastic member, deforming means to vary the tolerance between the inner and outer members.

3 Claims, 6 Drawing Figures

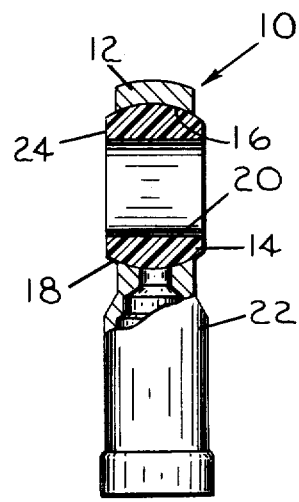
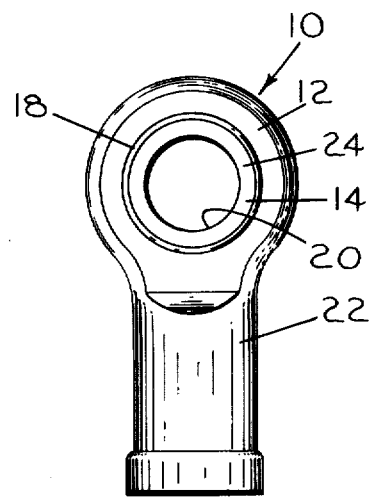
Fig.1  Fig.2
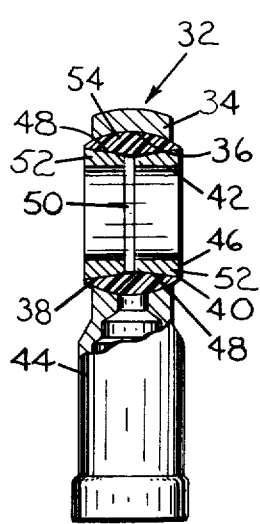
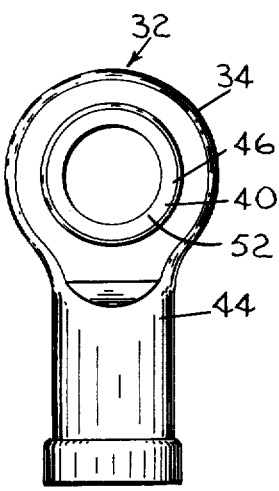
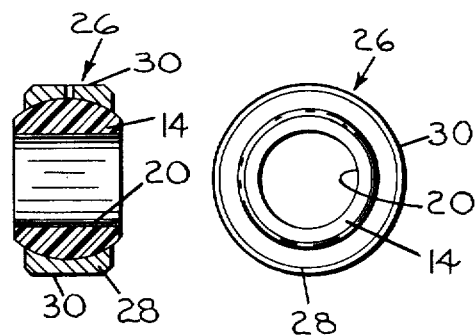
Fig.3  Fig.4  Fig.5  Fig.6

METHOD OF MANUFACTURING A SELF-ALIGNING BEARING WITH A DEFORMABLE INNER MEMBER

BACKGROUND OF THE INVENTION

The present invention relates to self-aligning bearings, including spherical bearings, spherical rod end bearings and the like. More particularly, the present invention relates to self-aligning bearings having a deformable plastic inner member which results in a bearing assembly having uniquely low coefficients of friction. Further, the bearing, in accordance with the present invention, may be "adjusted" in the field without disassembly or significant "down time" of the machine or apparatus with which it is operatively associated.

The self-aligning form of bearing has found wide acceptance in industry and has been used in a multiplicity of applications and in a variety of environments. As with any type of mechanical element, a spherical bearing will tend to wear at its bearing surfaces over long periods of operation. This wear will generally manifest itself in a "loose" fit between the inner member and outer member. That is, as the bearing surfaces defined by the outer surface of the inner member and the inner surface of the outer member wear, tolerance or gap between these two parts will increase. On many applications, the spherical bearing may play a vital role in the various machine elements that might comprise a process line or the like. Accordingly, any malfunction of the spherical bearing will result in a disabling of the process line which could cause significant economic loss and possible damage to other apparatus or device with which the spherical bearing is associated.

There have been attempts to provide a spherical bearing which can be readily adjusted in the field and these attempts have met with only limited success.

SUMMARY OF THE INVENTION

It is therefore the primary object of the present invention to provide a self-aligning bearing assembly comprising an outer member having a concave inner surface and an inner member carried within the outer member and having a convex outer surface generally complementary to the concave inner surface, the inner member being a deformable plastic member deforming means to vary the tolerance between the inner and outer members.

It is another object of the present invention to provide a self-aligning bearing assembly wherein the inner member is provided with a central bore and said deforming means includes the connecting means operatively connecting said inner member to an associated element at its central bore.

It is still another object of the present invention to provide a self-aligning bearing assembly wherein said connecting means comprises a nut and bolt assembly, the shank of said bolt disposed within said central bore, said nut threadably attached to said bolt to operatively connect said inner member to said associated element, the degree of deformation of said plastic member depending upon the torque applied to said nut.

It is yet another object of the present invention to provide a self-aligning bearing asseembly wherein said inner member is provided with an opening therethrough, a conical bushing disposed within said inner member at each open end of said opening.

It is a further object of the present invention to provide a self-aligning bearing assembly wherein there is provided within said opening a centrally disposed gap between each of said bushings abutting said rib.

It is still another object of the present invention to provide a self-aligning bearing assembly wherein the inner surface of said bushings define a central bore through said inner member.

It is still a further object of the present invention to provide a self-aligning bearing assembly wherein the conical bushings are molded in place in said inner member.

It is yet a further object of the present invention to provide a self-aligning bearing assembly wherein said conical bushings are each fitted within complememtary conical depressions formed at each end of the inner member.

It is a further object of the present invention to provide a self-aligning bearing assembly wherein said inner member is operatively connected to an associated element by a nut and bolt assembly, the shank of said bolt disposed within said opening, said nut threadably attached to said bolt, the said head of said bolt and the nut effecting the deforming force on said inner member through said conical bushings, the vectors of said force applied to said bushing to deform said inner member uniformly such that its convex outer surface remains substantially spherical.

It is also a further object of the present invention to provide a self-aligning bearing assembly wherein said inner member is manufactured from a self-lubricating plastic material.

It is yet another object of the present invention to provide a self-aligning bearing assembly having a deformable plastic inner member which is elemental in design and inexpensive to manufacture.

It is a further object of the present invention to provide a self-aligning bearing assembly having a deformable plastic inner member which can be manufactured using automated high volume techniques.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures.

DESCRIPTION OF THE DRAWINGS

FIG. 1 is a side sectional view in elevation of a rod end spherical bearing in an assembled state and in accordance with the present invention;

FIG. 2 is a front elevational view of the bearing of FIG. 1;

FIG. 3 is a side sectional view in elevation of a spherical bearing in an assembled state and in accordance with the present invention;

FIG. 4 is a front elevational view of the bearing of FIG. 3;

FIG. 5 is a side sectional view in elevation of a rod end spherical bearing in an assembled state and in accordance with another embodiment of the present invention;

FIG. 6 is a front elevational view of the bearing of FIG. 5.

DESCRIPTION OF THE INVENTION

Referring now to the figures and, in particular, FIGS. 1 and 2, there is shown a rod end spherical bearing 10 in its assembled state and partially sectioned (FIG. 1).

The rod end spherical bearing 10 is configured generally the same as rod end spherical bearings found in the prior art. That is, the rod end spherical bearing 10 comprises an outer member 12 and an inner member 14. The outer member 12 is provided with a concave inner surface 16. The concave inner surface 16 of the outer member 12 is generally complementary to the convex outer surface 18 of the inner member 14. The inner member 14 is provided with a central bore 20. The outer member 12 is provided with a rod end extension 22. The central bore 20 and the rod end extension 22 provide the means by which the rod end spherical bearing 10 is operatively attached to an associated machine element, apparatus or device. The rod end spherical bearing 10 of FIGS. 1 and 2 is of the female variety, that is, the rod end extension 22 is internally bored and threaded (not shown) and, accordingly, may be threadably attached to an appropriate male threaded machine element or the like. Similarly, a connecting means may be placed within the inner member 14 at its central bore 20 to effect operative attachment of the inner member to some associated machine element, apparatus or device. Typically, the connecting means will comprise some suitable form of nut and bolt assembly (not shown). The nut head typically will abut the end surface 24 of the inner member and the shank of the bolt will pass through the inner member 14 and, in particular, through the central bore 20. The nut which is typically threaded on the bolt will complete the operative attachment of the inner member to its associated machine element, etc. Accordingly, it can be seen that the nut and bolt arrangement effect a compressive force on the inner member 14. It is at this juncture that the present invention can best be understood for the inner member as shown in FIGS. 1 and 2 is of a deformable plastic material such as Delrin and Teflon, trademarks of Du Pont. The inner member 14, because of its deformable properties, may be adjusted or, more specifically, the bearing tolerance between the inner member 14 and the outer member 12 at their respective bearing surfaces (i.e., convex outer surface 18 and concave inner surface 16) may be changed. This tolerance can be changed by varying the compressive force on the deformable inner member 14. It can be seen therefore that increases in bearing tolerances caused, for example, by operational wear, can be compensated for by deforming the inner member. For example, all that would be required to decrease the tolerance between the inner member 14 and outer member 12 would be to tighten the aforementioned nut which operatively attaches the inner member to its associated machine element, apparatus or device. As the nut is threadably tightened on the connecting bolt, the compressive force exerted on the inner member will cause the inner member 14 to reduce its axial dimension and expand proportionately in a radial direction. This radial expansion will tend to reduce the gap or tolerance between the inner member 14 and the outer member 12. A mechanic therefore, by using a suitable wrench or other form of tool, could suitably adjust the rod end spherical bearing 10 in the field in its assembled state within an associated machine element, apparatus or device. Consequently, only a minimum amount of down time would be encountered and further, through proper maintenance each bearing could be "felt" to determine if adjustment was needed.

The spherical bearing 26 of FIGS. 3 and 4 is denoted by the same numerals as those in FIGS. 1 and 2 where applicable. The major distinction of the bearing of FIGS. 3 and 4 is that it is a spherical bearing and it is not provided with a rod end extension. The inner member 14 is connected or operatively attached to its associated machine element, apparatus or device in a manner similar to the rod end spherical bearing 10 of FIGS. 1 and 2. However, the outer member 28 is provided with an outer cylindrical surface 30. It is this outer cylindrical surface which is typically used to operatively attach the outer member 28 to its associated machine element, apparatus or device. Accordingly, the spherical bearing of FIGS. 3 and 4 are provided with the same unique characteristics as the rod end spherical bearing 10 which includes the provision of the deformable plastic inner member 14.

Referring now to FIGS. 5 and 6, there is shown another rod end spherical bearing 32 which embodies another form of the present invention. FIG. 5 shows the rod end spherical bearing 32 in its assembled state and partially sectioned while FIG. 6 shows a side elevational view of the bearing of FIG. 5.

The rod end spherical bearing 32 is provided with an outer member 34 whose configuration generally conforms to those found in the prior art. The outer member 34 is provided with a concave inner surface 36. This concave inner surface 36 of the outer member 34 is generally complementary to the convex outer surface 38 of the inner member 40. The inner member 40 is provided with a central bore 42. The outer member 34 is provided with a rod end extension 44. The central bore 42 and the rod end extension 44 provides the means by which the rod end spherical bearing 32 is operatively attached to an associated machine element, apparatus or device.

The rod end spherical bearing 32 of FIGS. 5 and 6 is of the female variety, that is the rod end extension 44 in integrally bored and threaded (not shown) and, accordingly, may be threadably attached to an appropriate male threaded machine element or the like. Similarly, a connection means may be placed within the inner member 40 and its central bore 42 to effect operative attachment of the inner member to some other associated machine element, apparatus of device, Typically, the connecting means, as with the before mentioned rod end spherical bearing 10 and spherical bearing 26, will comprise some suitable form of nut and bolt assembly (not shown). The nut head typically will abut the end surface 46 of the inner member and the shank of the bolt will pass through the inner member 40 and, in particular, through the central bore 42. The nut, which is typically threaded on the bolt, will complete the operative attachment of the inner member to its associated machine element, etc. Again, as with the before mentioned rod end spherical 10 and spherical bearing 26, it can be seen that the nut and bolt arrangement effect a compressive force on the inner member 40. It is at this juncture that the bearing of FIGS. 5 and 6 is best distinguished over the rod end spherical bearing 10 and spherical bearing 26. In particular, the inner member 40 of the rod end spherical bearing 32 is a composite structure having generally three elements or parts. The inner member 40 is provided with two conically configured openings 48 at each open end thereof. The conical openings 48 smoothly merge one into the other. The conical openings 48 are adapted to receive the conical bushing 52, that is, in each conical opening there is therein disposed the conical bushing 52. It can be seen from the figures and, in particular, FIG. 5 that the central bore 42 of the inner member 40 is defined by the inner surface of the conical bushings 52. It can also be seen that there is an annular gap 50 between the bushings 52. The convex outer surface 38 of the inner member 40 is defined entirely by the deformable plastic portion 54 of the inner member 40.

It should be noted at this point that the conical bushings 52 may be simply inserted within each of the conical openings 48 or, alternatively, may be molded in place when the inner member 40 is manufactured.

The inner member 40 and, in particular, the plastic portion 54 of the inner member 40 has deformable properties and characteristics similar to the deformable properties of the inner member 14 of the rod end spherical bearing 10. However, the deformable properties of the inner member 40 are more directionalized. The inner member 40 may be adjusted as to the before mentioned inner members by varying the compressive force on the deformable inner member by threadably tightening the nut on the connecting bolt. As the bolt is further tightened, the bushings 52 will be forced inwardly towards each other, reducing the axial width of the gap 50, and there will be an increase in this compressive force which will tend to reduce the axial dimension of the inner member 40 and expand it proportionally in a radial direction. The radial expansion of the inner member 40 will be somewhat more uniform than the radial expansion of the inner member 14 under similar circumstances. More specifically, as the compressive force isexerted on each of the conical bushings 52 at their respective end surfaces 46, the vectors of such force will radiate angularly and outwardly in a direction toward the convex outer surface 38. This radiating of the force vectors causes the convex outer surface to remain substantially spherical even as the compressive force is increased.

The conical bushings 52 may be manufactured from a wide range of suitable materials such as brass and steel. The plastic portion 54 of the inner member 40 may be manufactured from the same material that the inner member 14 of the rod end spherical bearing 10 was manufactured, that is, Delrin, Teflon, or the like.

Referring again to the rod end spherical bearing 10 of FIGS. 1 and 2, it should be appreciated that it can be manufactured using new and unique techniques as well as certain tried and tested prior art techniques. With respect to the latter technique, that is, prior art technique, the outer member 12 may be compressed uniformly around the inner member to complete the spherical bearing assembly as therein depicted. However, a departure from the prior art includes the deforming of the inner member 14 within a tapered die or the like (not shown) such that the diameter of the convex outer surface 18 is reduced dimensionally to enable the insertion of the inner member 14 within the outer member 12. Thereafter, the inner member 14 would be released to its natural state and would spring to its original dimension to be operatively supported within the outer member 12 at its concave inner surface 16. This unique method may also be applied to the spherical bearing 26 of FIGS. 3 and 4. An additional element of uniqueness may be included in the method of assembling the bearings of FIGS. 5 and 6. It can be seen that the plastic portion 54 with the conical bushings removed is even more deformable inwardly than the inner member 14 of the rod end spherical bearing 10 and spherical bearing 26. Accordingly, the plastic portion 54 may be, by the use of a tapered die, formed in a fashion as before noted with respect to the inner member 14 and once operatively in place within the outer member 34 can be further assembled by the insertion of the conical bushing in the conical openings 48.

Obviously, the present invention is not limited to the specific details as herein described, but is capable of other modifications and changes without departing from the spirit and scope of the appended claims.

I claim:

1. A method of manufacturing a self-aligning bearing comprising the steps of preforming an outer member having a spherical concave inner surface, preforming an inner member having a convex spherical outer surface generally complememtary to said concave inner surface, and providing said inner member with an opening therethrough, said opening being in the form of an outwardly divergent conical depression formed at each end of said inner member, said inner member being a deformable plastic member, deforming said plastic member inwardly such that the diameter of the convex outer surface of said inner member is reduced dimensionally, inserting said inner member within said outer member, releasing said inner member such that it regains its original dimension whereby it is operatively supported within said outer member at said outer member's concave inner surface.

2. A method of manufacturing a self-aligning bearing in accordance with claim 1 wherein said method includes the additional step of inserting an inwardly convergent conical bushing in each said conical depression after releasing said inner member within said outer member.

3. A method of manufacturing a self-aligning bearing in accordance with claim 1 wherein the deforming of said inner member includes placing and pushing said inner member within and through a tapered die.

* * * * *